H. Boyd,
Water-Closet Trap,

Nº 27,612. Patented Mar. 27, 1860.

Witnesses:
Lemuel W Serrell
Thos. Geo. Harold

Inventor:
Henry Boyd

UNITED STATES PATENT OFFICE.

HARKNESS BOYD, OF NEW YORK, N. Y.

TRAP FOR WATER-CLOSETS.

Specification of Letters Patent No. 27,612, dated March 27, 1860.

*To all whom it may concern:*

Be it known that I, HARKNESS BOYD, of the city and State of New York, have invented, made, and applied to use a certain new and useful Improvement in Traps and Bends for Water-Closets, &c.; and I do hereby declare that the following is a full, clear, and exact description of the nature of my said invention, reference being had to the annexed drawing, making part of this specification, wherein—

Figure 1:
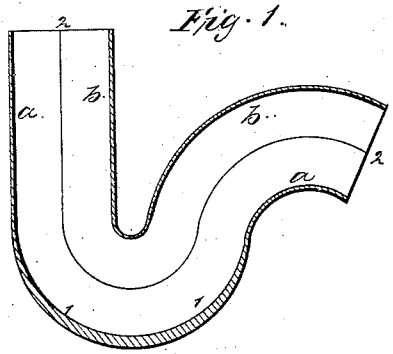
Figure 2:
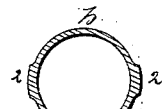
Figure 3:
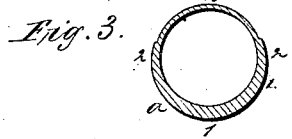

Figure 1, is a vertical section of my trap as complete. Fig. 2, is a cross section of the exit pipe, and Fig. 3, is a cross section at the bottom of the trap.

Similar marks of reference denote the same parts.

In forming the traps or bends for water closets it has hertofore been usual to dress sheet lead up to a pattern and form two half pipes that are afterward soldered together. On account of the compound form given to these traps it is exceedingly difficult to dress the sheet lead into form without making some parts much thinner than others, and this generally occurs at points where there is the most strain and greatest liability to tear the lead. Besides this there is more wear on the bottom part of the trap, and often obstructions lodging, are pushed and forced along by inexperienced hands instead of being lifted out, hence holes are often made in the bottom of the trap. To remedy this difficulty solder has sometimes been "wiped" onto the outside of the trap, but the same is costly, often injurious to the pipe and difficult of application; and to avoid the dressing up of sheet metal to form the trap, attempts have ben made to cast said traps whole in metal molds, but the compound curve of the same renders it almost impossible to remove a metal core unless constructed in a very complicated manner.

The nature of my said invention consists in casting the half pipes forming the traps and bends in metallic molds, whereby I am enabled to form additional thickness at the joints of the pipe where the soldering is applied. I am also enabled to make the bottom of the trap thicker at the part exposed to blows or wear. By my trap or bend cast as aforesaid I produce a new article and one that is much cheaper and more durable than any article heretofore produced.

In the drawing *a*, is the half pipe forming the lower and convex side of the trap or bend, having an additional thickness at 1, 1, at the part subject to wear or injury as aforesaid.

*b*, is the upper half pipe of the trap or bend. These half pipes are cast respectively in the molds shown in Figs. 4 and 5, and are united together by soldering at the joint 2, at which point the metal is to be cast thicker to give additional strength and surface for the solder to adhere to.

Figure 4:
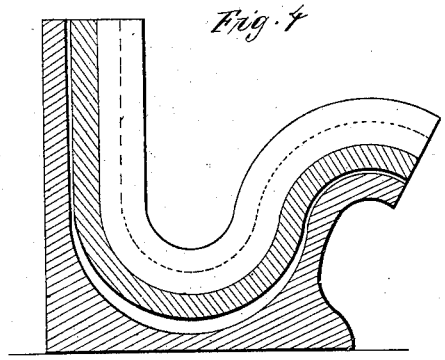
Figure 5:
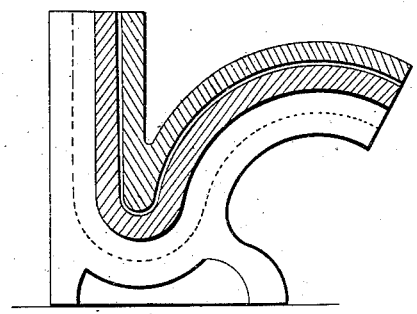

The metal molds shown in Figs. 4 and 5 are to be formed so as to set tightly together in pairs and leave the space needed for casting in the lead to form the respective half pipes. These molds not only save labor, and produce a better article than can be formed from sheet lead, but also enable plumbers to melt and use up their old scrap lead and save considerable thereby in the cost.

Having thus described my said invention what I claim and desire to secure by Letters Patent as a new article of manufacture is—

The trap or bend, for water closet and other pipes, cast in half sections as specified, whereby the metal is formed of additional thickness at the joints and parts exposed to strain or wear as set forth.

In witness whereof I have hereunto set my signature this eleventh day of February 1860.

HARKNESS BOYD.

Witnesses:
 LEMUEL W. SERREL,
 THOS. GEO. HAROLD.